(12) United States Patent
Xie et al.

(10) Patent No.: US 9,917,814 B2
(45) Date of Patent: *Mar. 13, 2018

(54) AUTOMATED CONFIGURATION OF ENDPOINT SECURITY MANAGEMENT

(71) Applicant: Fortinet, Inc., Sunnyvale, CA (US)

(72) Inventors: Michael Xie, Palo Alto, CA (US); Robert A. May, North Vancouver (CA); Jinhai Yang, Coquitlam (CA); Kunal Marwah, Delta (CA)

(73) Assignee: Fortinet, Inc., Sunnyvale, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/882,769

(22) Filed: Oct. 14, 2015

(65) Prior Publication Data
US 2016/0036780 A1 Feb. 4, 2016

Related U.S. Application Data (63) Continuation-in-part of application No. 14/284,159, filed on May 21, 2014.

(51) Int. Cl.
*H04L 29/08* (2006.01)
*H04L 12/24* (2006.01)
(Continued)

(52) U.S. Cl.
CPC ...... *H04L 63/0272* (2013.01); *H04L 12/4641* (2013.01); *H04L 29/08* (2013.01);
(Continued)

(58) Field of Classification Search
CPC ......... H04L 63/02; H04L 63/10; H04L 67/10; H04L 61/2076; H04L 12/24; H04L 12/00;
(Continued)

(56) References Cited

U.S. PATENT DOCUMENTS

| 6,947,986 B1 | 9/2005 | Huang et al. |
| 7,240,102 B1 * | 7/2007 | Kouznetsov ...... H04L 29/12216 709/220 |

(Continued)

OTHER PUBLICATIONS

Cisco AnyConnect Secure Mobility Client Administrator Guide, Release 3.0 Last Updated Dec. 3, 2012 (458 pages) http://web.archive.org/web/20140324124018/http://www.cisco.com/c/en/us/td/docs/security/vpn_client/anyconnect/anyconnect30/administration/guide/anyconnectadmin30.pdf.*

(Continued)

*Primary Examiner* — Joseph P Hirl
*Assistant Examiner* — Thomas Gyorfi
(74) *Attorney, Agent, or Firm* — Hamilton, DeSanctis & Cha LLP (57) ABSTRACT

Systems and methods for managing configuration of a client security application based on a network environment in which the client device is operating are provided. According to one embodiment, a network connection state of a client device with respect to a private network is determined by a client security application running on the client device. The client security application, then selects a configuration based on the determined network connection state. Finally, the client security application launches one or more functions of the client security application that are designated by the selected configuration.

16 Claims, 8 Drawing Sheets

(51) Int. Cl.
*H04L 29/06* (2006.01)
*H04L 12/46* (2006.01)
*H04W 12/00* (2009.01)
*H04L 12/26* (2006.01)
*H04L 29/12* (2006.01)

(52) U.S. Cl.
CPC ...... *H04L 41/0816* (2013.01); *H04L 43/0811* (2013.01); *H04L 67/10* (2013.01); *H04L 67/125* (2013.01); *H04L 67/42* (2013.01); *H04W 12/00* (2013.01); *H04L 61/2015* (2013.01)

(58) Field of Classification Search
CPC ..... H04L 29/08; H04L 41/08; H04L 41/0803; H04L 41/0806; H04L 41/0809; H04L 41/0813; H04L 41/0816; H04L 41/084; H04L 41/0843
See application file for complete search history.

(56) References Cited

U.S. PATENT DOCUMENTS

| | | | |
|---|---|---|---|
| 8,862,730 B1 | 10/2014 | Hernacki et al. | |
| 2002/0138551 A1 | 9/2002 | Erickson | |
| 2004/0162992 A1 | 8/2004 | Sami et al. | |
| 2005/0015458 A1 | 1/2005 | La | |
| 2005/0120138 A1 | 6/2005 | Carmello et al. | |
| 2006/0031436 A1 | 2/2006 | Sakata et al. | |
| 2007/0143851 A1 | 6/2007 | Nicodemus et al. | |
| 2008/0288614 A1 | 11/2008 | Gil et al. | |
| 2009/0006600 A1 | 1/2009 | Siegmund | |
| 2009/0067440 A1 | 3/2009 | Chadda et al. | |
| 2009/0132682 A1 | 5/2009 | Counterman | |
| 2009/0296567 A1 | 12/2009 | Yasrebi et al. | |
| 2011/0010437 A1 | 1/2011 | Christenson et al. | |
| 2011/0235549 A1 | 9/2011 | Ahlers et al. | |
| 2013/0133043 A1* | 5/2013 | Barkie | H04L 63/10 726/4 |
| 2013/0232251 A1 | 9/2013 | Pauley | |
| 2013/0304796 A1 | 11/2013 | Jackowski et al. | |
| 2013/0340050 A1 | 12/2013 | Harrison | |
| 2014/0189843 A1 | 7/2014 | Francisco et al. | |
| 2014/0298415 A1 | 10/2014 | Xie et al. | |
| 2014/0344446 A1 | 11/2014 | Rjeili et al. | |
| 2015/0003282 A1 | 1/2015 | Gourlay et al. | |
| 2015/0341311 A1 | 11/2015 | Xie et al. | |
| 2016/0044114 A1 | 2/2016 | Xie et al. | |

OTHER PUBLICATIONS

Non-Final Rejection for U.S. Appl. No. 14/284,159 dated Jul. 5, 2016.
R. Droms. "RFC 2131: Dynamic Host Configuration Protocol." Mar. 1997. 45 pgs. htts://www.ietf.org/rfc/rfc2131.txt.
Non-Final Rejection for U.S. Appl. No. 14/882,726 dated Jul. 5, 2016.
Final Rejection for U.S. Appl. No. 14/882,726 dated Jan. 3, 2017.
Final Rejection for U.S. Appl. No. 14/284,159 dated Dec. 19, 2016.

* cited by examiner

AUTOMATED CONFIGURATION OF ENDPOINT SECURITY MANAGEMENT

CROSS-REFERENCE TO RELATED APPLICATIONS

This application is a continuation-in-part of U.S. patent application Ser. No. 14/284,159, filed May 21, 2014, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014-2015, Fortinet, Inc.

BACKGROUND

Field

Embodiments of the present invention generally relate to the field of network security techniques. In particular, various embodiments relate to providing various endpoint security management features based on information regarding the network environment of the client device.

Description of the Related Art

A challenge for network security management is keeping the network secure while allowing many different kinds of devices to connect to the network from inside or outside of the network. In a Bring Your Own Device (BYOD) environment, employees are allowed to use their personal mobile computing devices, for example, to access a company's network from anywhere. To protect the network from attacks and prevent leaking of sensitive information, a firewall is typically deployed to separate the Internet from the internal network. When a user device connects to the company's network from inside (which is referred as to "on-net" in the description), the firewall protects the user device by checking the data packets or contents transferred from/to the user device. When users connect to the company's network from outside through an external network, such as the Internet (which is referred as to "off-net" in the description), they typically do so via a virtual private network (VPN) that is established between the user device and a gateway of the company's network so that the communication between the user device and the company's network cannot be intercepted by a third party.

A client security application running on the user device is commonly used for protecting the user device from various attacks. As the user device may operate in different network environments, such as an on-net state and an off-net state, the user typically needs to change the configuration of the user device manually so that corresponding functions of the client security application may be launched. Therefore, there is a need for a convenient way to manage the endpoint security based on information regarding the network environment in which the user device is operating.

SUMMARY

Systems and methods are described for managing configuration of a client security application based on a network environment in which the client device is operating. According to one embodiment, a network connection state of a client device with respect to a private network is determined by a client security application running on the client device. The client security application, then selects a configuration based on the determined network connection state. Finally, the client security application launches one or more functions of the client security application that are designated by the selected configuration.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for managing configuration of a client security application based on a network environment in which the client device is operating. According to one embodiment, when a client security application is started on a client device, an identification of a network appliance is retrieved from the client device. The identification is distributed to the client device by the network appliance when the client device is connected from inside of a network that is protected by the network appliance. By checking the identification, the client security application may determine whether the client device is currently connected from inside of the network. The client security application may select different configurations based on the network environment in which the client device is present.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The phrase "client device" generally refers to a computing device that may access resources through a network connection. A client device may be an endpoint device located at or near the edge of a network and is capable of running one or more applications for a single user. Examples of client devices include, but are not limited to, desktop or laptop personal computers (PCs), handheld computers, tablets and smartphones.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Figure 1:
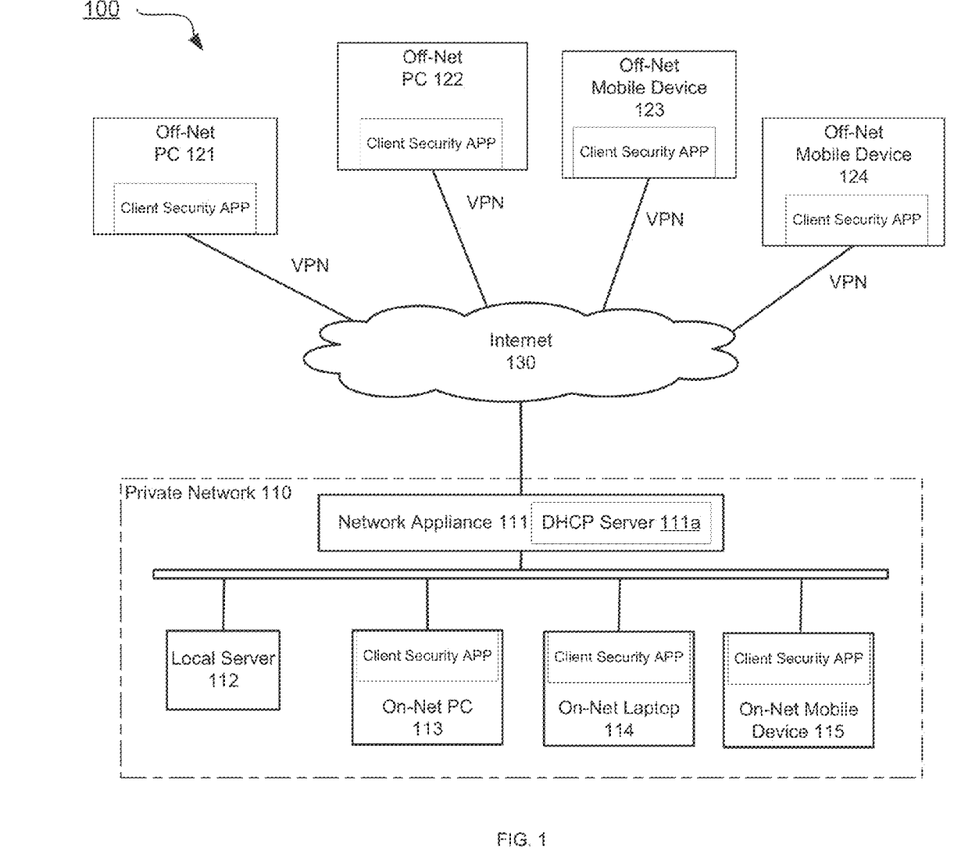
FIG. 1 illustrates an exemplary network architecture in accordance with an embodiment of the present invention.

FIG. 1 illustrates an exemplary network architecture in accordance with an embodiment of the present invention. The network architecture 100 shown in FIG. 1 comprises a private network 110 which is connected to the Internet 130. Private network 110 comprises multiple network appliances, such as local server 112, on-net PC 113, on-net laptop 114, on-net mobile phone 115 and other computing devices that are operatively coupled to each other through a Local Area Network (LAN), wherein the LAN is then operatively coupled with network appliance 111 which enable the access to Internet 130. Other network appliances, such as off-net PC 121, off-net PC 122, off-net mobile device 123 and off-net mobile device 124 may connect to private network 110 from outside through Internet 130.

Network appliance 111 separates the external computing environment, represented by Internet 130, from the internal computing environment of private network 110. Network appliance 111 may intercept the communication between Internet 130 and the network appliances of private network 110 and may, among other things, scan for malware, viruses or high risk network accesses. Network appliance 111 may include a DHCP server 111a that is capable of assigning network settings, such as Internet Protocol (IP) addresses, subnet masks, default gateways, to on-net client devices when the client devices connect to the network from inside private network 110. In embodiments of the present invention, an identification, such as the serial number, of network appliance 111 may be communicated to client devices through an option field in a DHCPACK packet.

When a DHCP client, such as local server 112, on-net PC 113, on-net laptop 114, on-net laptop 114 or on-net mobile phone 115, connects to private network 110 from inside, IP network settings may be assigned automatically by DHCP server 111a. According to the DHCP protocol, a DHCPDISCOVERY message is broadcasted by the DHCP client on the physical subnet to discover an available DHCP server. DHCP server 111a receives the DHCPDISCOVERY message and offers IP network settings to the DHCP client through a DHCPOFFER message. Then, a DHCPREQUEST message is broadcasted by the DHCP client to DHCP server 111a to request the offered settings. After receiving the DHCPREQUEST message, DHCP server 111a sends a DHCPACK packet that includes identification information relating to network appliance 111 to the DHCP client. After receiving all the network settings, the DHCP client sets its IP network parameters to those received from DHCP server 111a and the identification information relating to network appliance 111 received as a DHCP option parameter may be saved to a system registry of the DHCP client.

When a DHCP client, such as off-net PC 121, off-net PC 122, off-net mobile device 123 and off-net mobile device 124, is connected to a network other than private network 110, such as Internet 130, a DHCP server of an Internet service provider (ISP) assigns IP network settings to the off-net DHCP client. The off-net DHCP client receives IP network settings from the ISP, but does not receive identification information regarding network appliance 111.

A client security application may be installed on each of the on-net and off-net client devices. The client security application may include multiple engines that provide security functions, such as anti-virus, Secure Sockets Layer (SSL)/Internet Protocol Security Protocol (IPSec) Virtual Private Networking (VPN), web filtering, application firewalling, two-factor authentication, vulnerability scanning and Wide Area Network (WAN) optimization. These security functions may be launched optionally when the client security application is started depending upon the network environment. For example, a VPN connection between a client device and the gateway of private network 110 may be established by client security application when the client device is off-net, e.g., it is connected to private network 110 indirectly through Internet 130. A VPN connection is not necessary when the client device is on-net, e.g., it is directly connected to private network 110 from behind the firewall. Some functions such as web filtering and network access logging may be conducted by both network appliance 111 and client security application, these functions should be launched when a client device is off-net and are optional when the client device is on-net. Therefore, it is more convenient for the user if an appropriate configuration of the client security application is selected automatically based on the network environment and corresponding functions or engines associated with the selected configuration are launched when the client security application is started. In one embodiment, to do this, the client security application determines whether the client device is on-net or off-net based on whether identification information of a firewall has been communicated from a DHCP server and stored by a DHCP client running on the client device. In one embodiment, identification information of network appliance 111 that is saved as a DHCP option may be retrieved by corresponding application programming interfaces (APIs) provided by the operating system of the client device. In another embodiment, the client security application may capture one or more DHCP packets received from network appliance 111 and retrieve identification information of network appliance 111 from the captured DHCP packets. When identification information of a firewall is ascertainable by the client security application, it may determine that the client device is in a first network environment state (e.g., "on-net"). Responsive to making a determination that the client device is on-net, an on-net configuration may be selected by the client security application and corresponding functions/engines of the client device may be launched. When identification information of a firewall cannot be ascertained by the client security application, it may determine that the client device is in a second network environment state (e.g., "off-net"). Responsive to making a determination that the client device is off-net, an off-net configuration may be selected by the client security application and corresponding functions/engines of the client device are launched.

Figure 2:
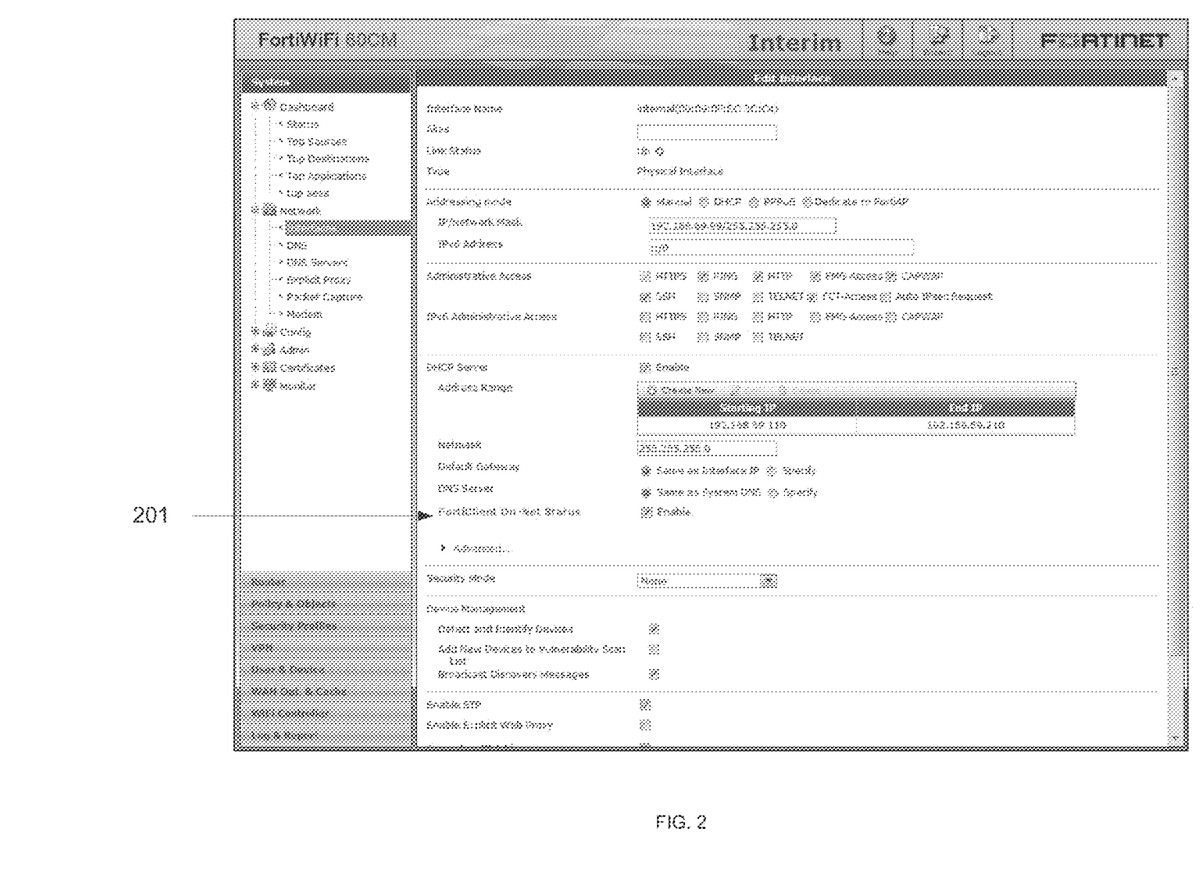
FIG. 2 illustrates a graphical user interface screen shot, which may be used to define an on-net status option for a Dynamic Host Configuration Protocol (DHCP) server in accordance with an embodiment of the present invention.

FIG. 2 illustrates a graphical user interface screen shot, which may be used to define an on-net status option 201 for a DHCP server in accordance with an embodiment of the present invention. In the context of the present example, on-net status option 201 is added to a DHCP server of a firewall. When the option is enabled, identification information regarding the firewall is communicated to client devices via their DHCP clients when they issue DHCP requests to the DHCP server. For example, the identification information may be communicated to the client device via a DHCP client running thereon via an option field of a DHCPACK packet transmitted from the DHCP server to the DCHP client. The identification may comprise a serial number of the firewall or a unique name assigned to the firewall. Those skilled in the art will appreciate that various other types of identification information may be employed. For example, if two or more firewalls are configured as a high availability (HA) cluster, the identification information may include serial numbers of all cluster members or a unique cluster name. In some embodiments, the identification information may comprise a hash of a serial number or serial numbers.

Figure 3:
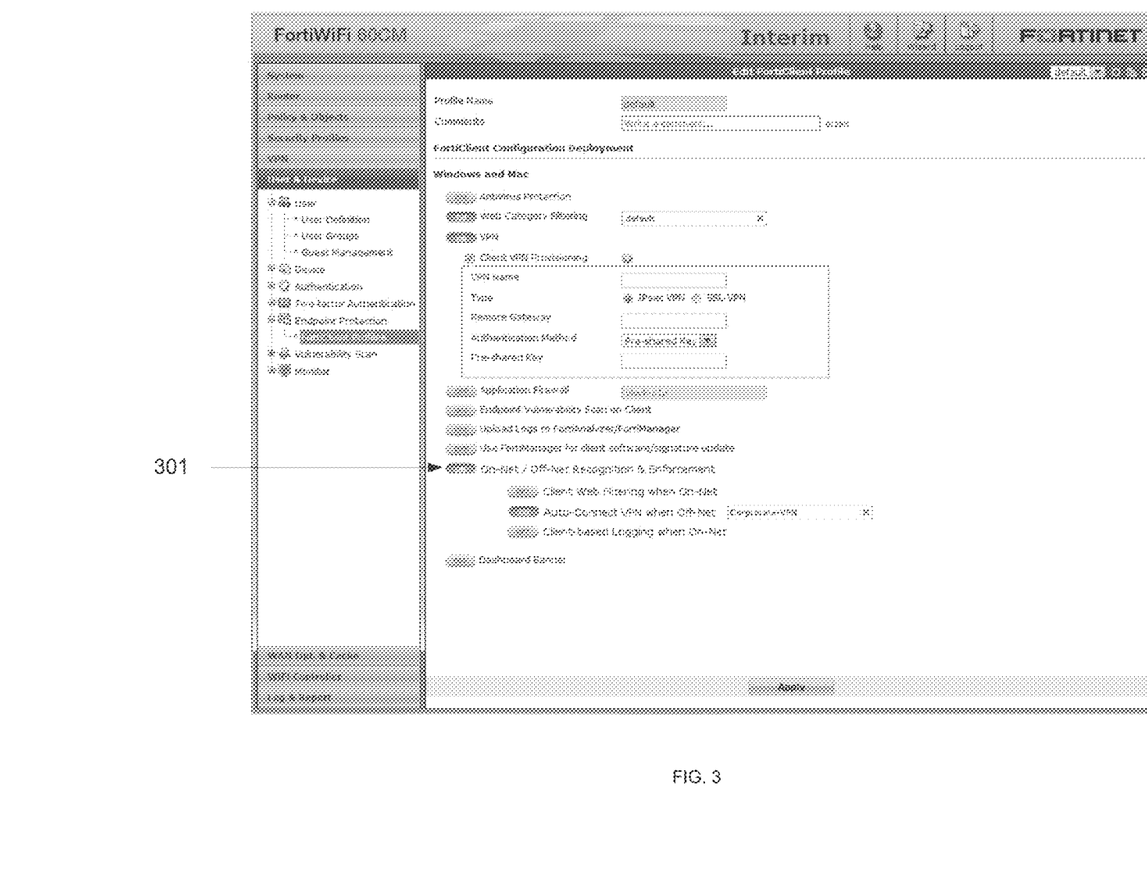
FIG. 3 illustrates a graphical user interface screen shot, which may be used to define function options for a client security application in accordance with an embodiment of the present invention.

FIG. 3 illustrates a graphical user interface screen shot, which may be used to define function options for a client security application in accordance with an embodiment of the present invention. In the context of the present example, a default configuration of the client security application is set by the administrator of the firewall. When the client security application is registered with the firewall, the default configuration may be downloaded to the client security application. As shown in FIG. 3, option 301, "on-net/off-net recognition & enforcement," is set ("on") and the "auto-connect VPN when off-net" option is also set. In this case, the default configuration of a client security application has the on-net/off-net recognition function enabled and a VPN connection is established automatically when an off-net network environment state is detected.

Figure 8:
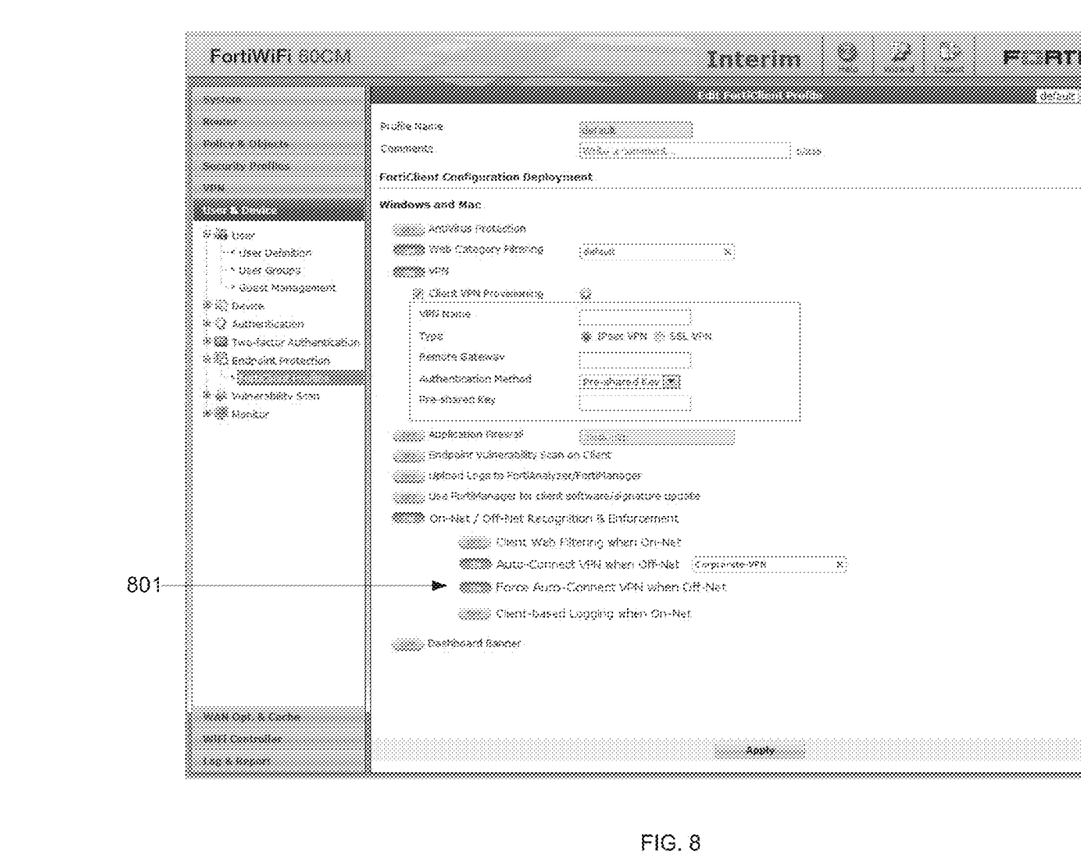
FIG. 8 illustrates a graphical user interface screen shot, which may be used to define function options for a client security application in accordance with another embodiment of the present invention.

FIG. 8 illustrates a graphical user interface screen shot, which may be used to define function options for a client security application in accordance with another embodiment of the present invention. In the context of the present example, the "auto-connect VPN when off-net" option is set ("on") and option 801, "Force Auto-Connect VPN when Off-Net", is also set ("on"). In this case, a VPN connection is established automatically when an off-net network environment state is detected and the VPN connection is kept in force and a user of the client device is not allowed to disconnect the VPN connection that is automatically established. For example, in the event of VPN connection going down because of network change event or wired/wireless connection state change, the VPN connection is automatically reconnected by the client device. In this manner, the user does not have to manually reconnect. In another example, a control button/option for disconnecting the VPN connection within a user interface may be disabled or hidden by the client security application so as to prevent the user of the client device from disconnecting the VPN connection.

Figure 4:
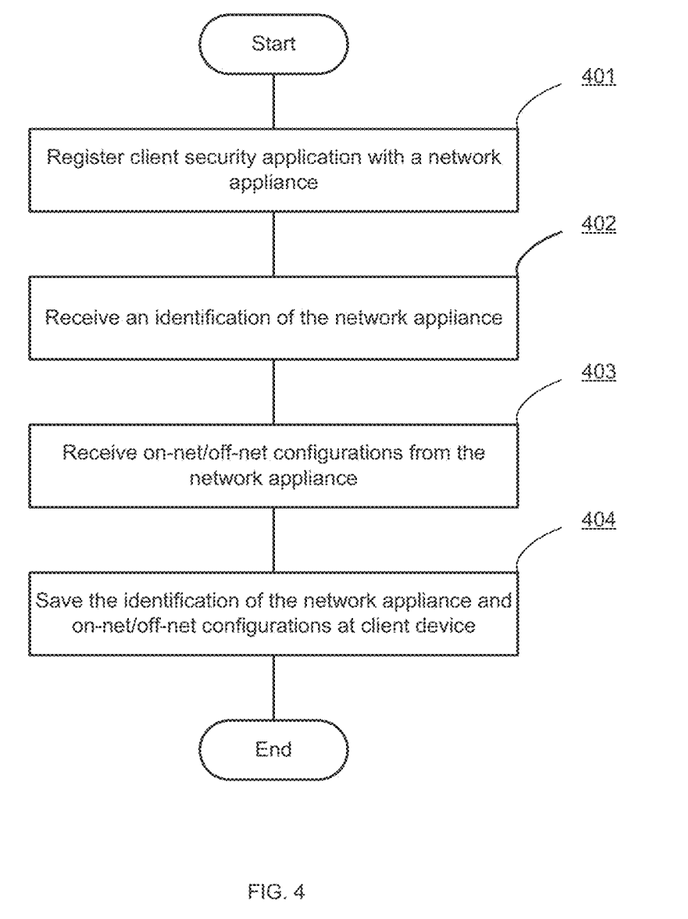
FIG. 4 is a flow diagram illustrating a process for registering a client security application with a network appliance in accordance with an embodiment of the present invention.

FIG. 4 is a flow diagram illustrating a process for registering a client security application with a network appliance in accordance with an embodiment of the present invention.

At block 401, a client security application registers with a network appliance. Usually, at the end of the installation procedure or the first time the client security application is run, an installer program or the client security application asks the user to register the client security application with a network appliance. If the user agrees to register, a register request is sent to a designated firewall.

At block 402, if the registration is successful, identification information associated with the network appliance is communicated back to the client security application. Depending upon the particular implementation, the identification information may include a serial number or a unique name of the network appliance. Alternatively, if the network appliance is a member of a HA cluster, the serial number of each member of the HA cluster or a unique name of the HA cluster may be fed back to the client security application. For security reasons, a hash value of a serial number may be used instead of the serial number itself.

At block 403, default on-net/off-net configurations may be received from the network appliance by the client security application. The on-net/off-net configurations may set which functions/engines should be launched automatically when the client device is on-net or off-net. A user of the client security application may further edit the downloaded on-net/off-net configuration. According to one embodiment, the on-net/off-net configurations are those established by the administrator of the network appliance via the graphical user interface screen shot depicted by FIG. 3.

At block 404, identification information associated with the network appliance with which the client security application is registered together with the default on-net/off-net configurations associated with the network appliance are stored locally by the client security application. It is apparent to one skilled in the art that the client security application may register with multiple network appliances. For example, a client device may be connected from inside to a headquarters network and register with the firewall of the headquarters network. The same client device may also be connected from inside to a branch office network and register with the firewall of the branch office network. Therefore, a list of identifications of network appliances with which the client security application is registered may be maintained by the client security application or the client device. Similarly, a set of on-net/off-net configurations may also be maintained by the client security application or the client device.

Figure 5:
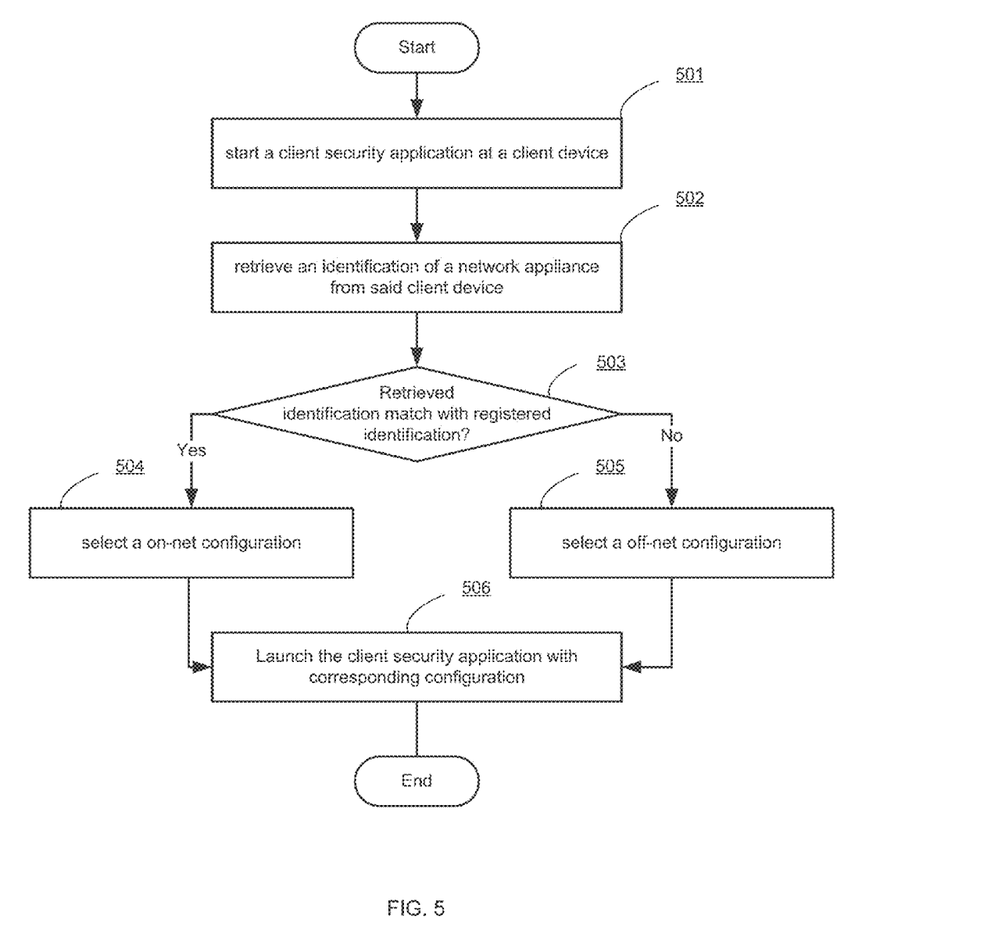
FIG. 5 is a flow diagram illustrating a process for managing a client security application based on an on-net/off-net state in accordance with an embodiment of the present invention.

FIG. 5 is a flow diagram illustrating a process for managing a client security application based on an on-net/off-net state in accordance with an embodiment of the present invention. In this embodiment, the client device on which a client security application is installed represents a DHCP client and a set of network parameters are assigned to the client device by a DHCP server based on the DHCP protocol. These network parameters, which may include identification information associated with the network appliance, may be saved within a system registry of the client device, for example.

At block 501, a client security application is started at a client device. The client security application may be started manually by a user or it may be loaded automatically when the client device is booted.

At block 502, the client security application retrieves from the client device identification information of a network appliance associated with the network environment to which the client device is presently connected. Depending upon the operating system of the client device, the identification information of the network appliance that is associated with the network environment to which the client device is presently connected together with other IP network parameters may have previously been saved within a system registry of the client device and may be capable of being retrieved by corresponding APIs.

At block 503, the client security application may compare the retrieved identification information with the identification information of one or more network appliances with which the client security application is registered. It will be apparent to one skilled in the art that it is possible that the on-net state may be determined if identification information is simply available on the client device; however, by comparing the retrieved identification information with the registered identification information, the client security application may determine that the client device is within a network that is controlled by a firewall with which the client security application is registered. If the retrieved identification information matches with the registered identification information, the client security application may determine that the client device is on-net and the process continues with block 504. If the retrieved identification information does not match the registered identification information or there is no identification information is retrievable/available, the client security application may determine that the client device is off-net and the process branches to block 505.

At block 504, it has been determined that the client device is in an on-net network environment state. As such, the client security application selects an on-net configuration. The on-net configuration may be the default on-net configuration that is received by the client security application when registered with the network appliance. The user of the client security application may also setup or change the on-net configuration.

At block 505, the client security application selects an off-net configuration as the client device has been determined to currently be off-net. The off-net configuration may be the default off-net configuration that is received by the client security application when registered with the network appliance. The user of the client security application may also setup or change the off-net configuration.

After the appropriate configuration is selected based on the client device's network environment state, at block 506, the client security application continues the startup procedure by launching the functions/engines that are associated with the corresponding configuration. For example, when an off-net configuration is selected and SSL/IPsec VPN and web filtering are enabled (e.g., set to "on") in the off-net configuration, the client security application launches a VPN dial-up module and establishes a VPN connection with a gateway of a private network using predefined VPN parameters. The client security application may also launch a web filtering engine to check the content transmitted to/from the client device based on local security policies.

Figure 6:
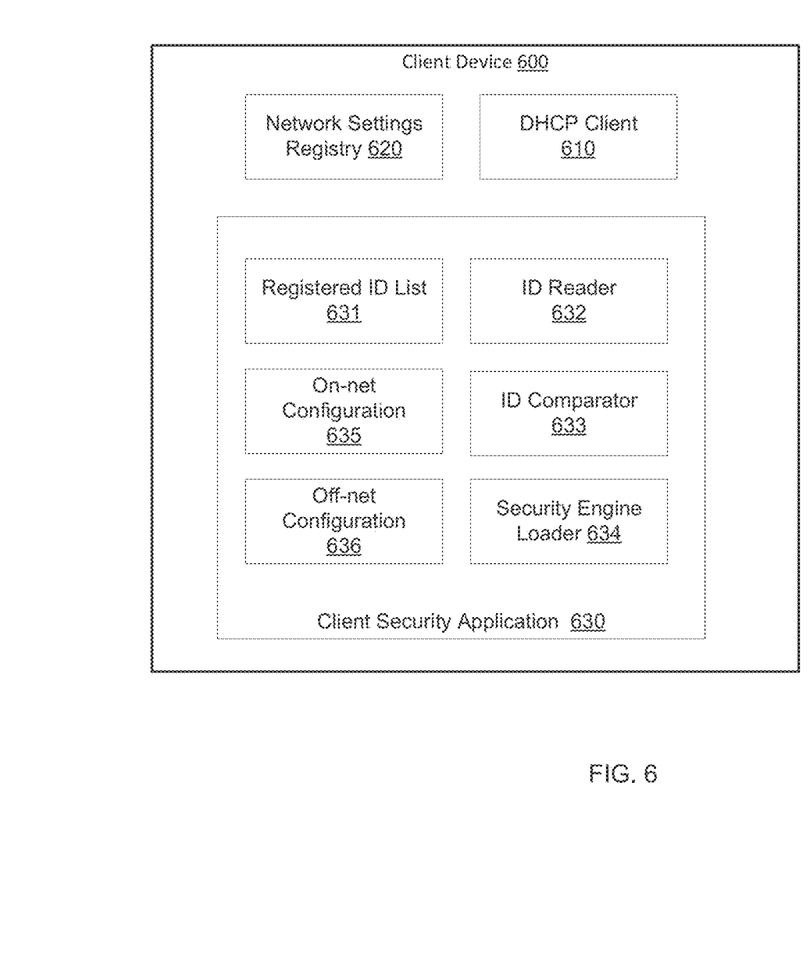
FIG. 6 illustrates exemplary functional units of a client device and a client security application in accordance with an embodiment of the present invention.

FIG. 6 illustrates exemplary functional units of a client device 600 and a client security application 630 in accordance with an embodiment of the present invention. In the context of the present example, client device 600 includes a network settings registry 620, a DHCP client 610 and a client security application 630. Client security application 630 further includes a registered ID list 631, an ID reader 632, an ID comparator 633, a security engine loader 634, an on-net configuration 635 and an off-net configuration 636.

DHCP client 610 is used for requesting IP network parameters from a DHCP server and applies the IP network parameters at the client device 600. In embodiments of the present invention, identification information of a network appliance that is hosting the DHCP server is also received by DHCP client 610. For example, the identification information may be communicated from the DHCP server to DHCP client as a DHCP option within a DHCPACK packet. The network settings together with the identification information may then be saved to network setting registry 620.

Registered ID list 631 is a list of identification information of network appliances with which client security application 630 is registered. The identification information may be stored by client security application 630 as registration with particular network appliances is confirmed. As noted earlier, the identification information may include a serial number of the network appliances or a hash value thereof.

On-net configuration 635 may comprises optional settings that determine whether certain functions/engines should be launched automatically if client device 600 is directed connected to the network or connected from inside of the network that is protected by the network appliance with which client security application 630 is registered. The settings may comprise client web filtering, VPN auto-connection, client-based logging for on-net connection. On-net configuration 635 may be received by client security application 630 when registering with the network appliance. The user of client security application 630 may further amend on-net configuration 635 or create a new on-net configuration 635 manually.

Off-net configuration 636 may comprises optional settings that determine whether certain functions/engines should be launched automatically if client device 600 is indirectly connected to the network or connected from outside of the network that is protected by the network appliance with which client security application 630 is registered. Usually, client web filtering, VPN auto-connection and client-based logging are enabled (set to "on") for off-net connections so that client device 600 may be protected by client security application 630 when it is off-net.

ID reader 632 is used for retrieving the identification information of network appliance from network setting registry 620 when client security application 630 is started. Because, in one embodiment, the identification information of network appliance is received and saved as one of the DHCP options when client device 600 is connected to the network, ID reader 632 may be implemented through corresponding APIs that may access the DHCP options.

ID comparator 633 is used for comparing the identification information retrieved from the stored DHCP options with the registered identification information to determine if client device 600 is now connected from inside of a network that is protected by a registered network appliance. If the retrieved identification information from network setting registry 620 matches with identification information in registered ID list 631, the client security application may determine that the client device is on-net. If the retrieved identification information does not match with registered identification information or no identification information is retrieved, the client security application may determine that the client device is currently off-net.

Security engine loader 634 is used for loading functions/engines of client security application 630 based on on-net or off-net configurations that are determined by ID comparator 633. For example, security engine loader 634 may start a VPN dial up module and a VPN connection may be established automatically if a VPN auto-connect option is enabled (set to "on") in the off-net configuration. Security engine loader 634 may disable web filtering functions of client device 600 and let the network appliance do the web filtering if a web filtering option is disabled (set to "off") in an on-net configuration.

Further, a force VPN auto-connect option may be provided the network administrator. When this option is enabled (set to "on") in the off-net configuration, a user of client device 600 is not allowed to disconnect the VPN connection that is automatically established by security engine loader 634. The VPN auto-connection is always in force when client device 600 is off-net. Further, a control button of disconnecting the VPN connection may be disabled or hidden when this option is set to "ON".

Figure 7:
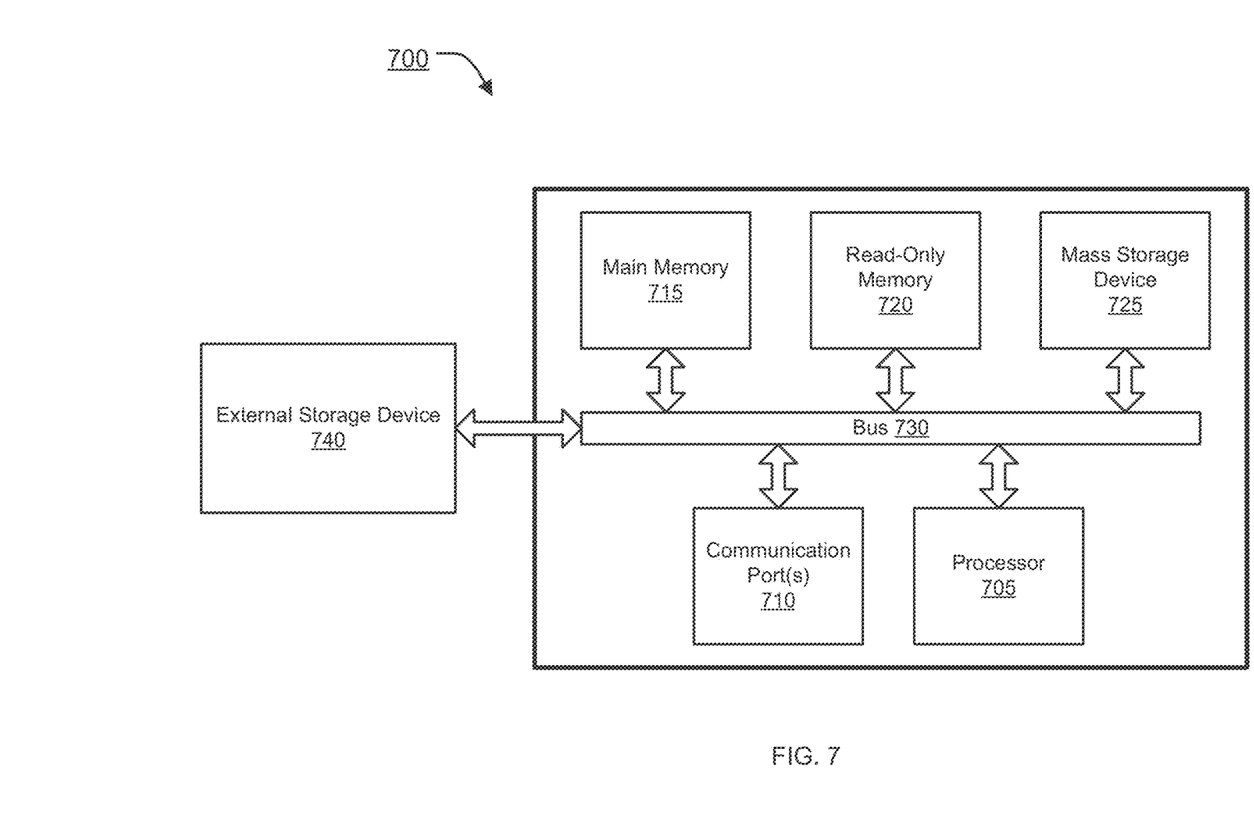
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network appliance, a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
during initialization of a client security application running on a client device:
determining, by the client security application, a network connection state of the client device with respect to a private network;
selecting, by the client security application, a configuration for the client security application based on the determined network connection state; and
launching, by the client security application, one or more functions of the client security application that are designated by the selected configuration to be performed by the client security application; and
wherein the one or more functions include:
establishing a Virtual Private Networking (VPN) connection with the private network; and
maintaining the VPN connection when the client device is connected indirectly to the private network via an intermediate network.

2. The method of claim 1, wherein said determining a network connection state of the client device with respect to a private network comprises determining whether the client device is connected indirectly to the private network via an intermediate network.

3. The method of claim 2, wherein said determining whether the client device is connected indirectly to the private network via an intermediate public network comprises determining, by the client security application, presence of identification information stored on the client device that is associated with one or more network security appliances that are protecting the private network.

4. The method of claim 3, wherein said determining whether the client device is connected indirectly to the private network via an intermediate public network further comprises determining, by the client security application, whether the identification information matches previously stored identification information associated with a network security appliance with which the client security application is registered.

5. The method of claim 3, further comprising:
sending, by a Dynamic Host Configuration Protocol (DHCP) client of the client device, a DHCP packet to a network security appliance of the one or more network security appliances; and
responsive to the DHCP packet, receiving by the DHCP client, an acknowledgement DHCP packet containing therein the identification information.

6. The method of claim 5, wherein the identification information is contained within a DHCP option field of the DHCP packet.

7. The method of claim 5, wherein the identification information is encrypted by the network security appliance.

8. The method of claim 5, wherein the one or more functions further include one or more of anti-virus scanning, Secure Sockets Layer (SSL)/Internet Protocol Security Protocol (IPSec), web filtering, application firewalling, two-factor authentication, vulnerability scanning and Wide Area Network (WAN) optimization.

9. The method of claim 3, wherein said determining a network connection state of the client device with respect to a private network comprises comparing, by the client security application, the identification information with identification information stored in a registry of the client device as a result of interactions between a DHCP client of the client device and a DHCP server.

10. The method of claim 9, wherein the network connection state is selected from an on-net state, indicating the client device is connected directly to the private network, and an off-net state, indicating the client device is connected to the private network indirectly via an intermediate network.

11. The method of claim 10, further comprising:
when said comparing results in a match, then determining, by the client security application, the network connection state of the client device with respect to the private network is the on-net state; and
otherwise, determining, by the client security application, the network connection state of the client device with respect to the private network is the off-net state.

12. The method of claim 3, wherein the identification information represents identification information associated with a high availability (HA) cluster of network security appliances.

13. The method of claim 3, wherein the identification information comprises (i) a serial number or a hash value of the serial number of the one or more network security appliances, (ii) a unique name of the one or more network appliances or (iii) a hash value of a plurality of serial numbers of the one or more network security appliances.

14. The method of claim 1, further comprising:
registering, by the client security application, with a network security appliance protecting the private network; and
receiving, by the client security application, identification information associated with the network security appliance.

15. The method of claim 1, wherein said maintaining the VPN connection further comprises one or more of:
disabling, by the client security application, a control within a user interface that is used for disconnecting the VPN connection; and
hiding, by the client security application, the control.

16. The method of claim 1, wherein said maintaining the VPN connection further comprises reestablishing, by the client security application, the VPN connection responsive to determining loss of the VPN connection.

* * * * *